Oct. 17, 1961 G. E. BURDICK ET AL 3,004,617
ELECTRICALLY CONTROLLED BATCHING SYSTEM
Filed June 30, 1958 6 Sheets-Sheet 5

INVENTORS
GEORGE E. BURDICK
ROLAND O. FAUST
BY
ATTORNEY

FIG. 8

United States Patent Office 3,004,617
Patented Oct. 17, 1961

---

3,004,617
ELECTRICALLY CONTROLLED BATCHING SYSTEM
George E. Burdick, Hudson, and Roland O. Faust, Attleboro, Mass., assignors to Baldwin-Lima-Hamilton Corporation, a corporation of Pennsylvania
Filed June 30, 1958, Ser. No. 745,357
6 Claims. (Cl. 177—12)

This invention relates to batching systems and, more particularly, to a fully automatic electrical batching system.

Batch mixing of various ingredients as heretofore practiced has involved many structural and functional deficiencies especially where high accuracy, repeatability, and flexibility of operation are essential as well as other desirable features.

One object of our invention is to provide an improved automatic electrical batching system involving a combination of elements and circuits so functionally and structurally inter-related that it is possible: to obtain a high degree of flexibility in allowing random pre-selection of the sequence in which ingredients are to be added to or omitted from the batching operation and in preselecting the individual desired weights of the ingredients; to check the actual weight of each individual ingredient independently of any error in the weight of preceding ingredients; and to initiate the supply of the next ingredient if the checked weight is within tolerance, as well as to perform many other functions that supplement the foregoing operations or are incident thereto.

Another object is to provide a batching system having an improved electrical weight measuring and recorder means adapted to produce a wide recorder span in the critical area in which it is desired to determine the amount by which the weight of the ingredient deviates, or is in error, from a desired predetermined value, this being accomplished in our invention by measuring and recording only the amount of such deviation thereby permitting the use of the full scale of the recorder to cover the relatively small amount of error.

A further object is to provide a batching system in which an improved electrical weight-measuring means is so arranged that it automatically returns to a zero position after each individual ingredient is weighed whereby as far as the measuring system is concerned no weight exists in the batching container preparatory to weighing the next ingredient.

A still further object is to provide a completely automatic batching system that is relatively economical in construction, operation, and maintenance, considering the complexity of functions performed, and that has compactness and sufficient self-containment to permit easy installation remotely from the batching container.

Additional objects are to provide several improved means in a batching system such, for example, as: for controlling fast and slow (dribble feed) ingredient supply valves to minimize overshooting the desired weight of ingredients; for adjusting weight-set potentiometer networks, one for each ingredient, to establish most accurately pre-set individual weights thereof; for insuring a completely automatic, fail-safe, self-checking system for precision batching that is especially useful in heavy industrial service; and for insuring that the system may be converted, if necessary or desired, to manual operation; as well as providing a system that allows, if desired, usual card or tape read-in devices to be used at certain of the control points in place of equivalent switches.

Further objects and advantages will be more apparent to those skilled in the art from the following description of the accompanying drawings in which.

The combination of elements comprising our batching system will be more readily understood by describing it in connection with its mode of operation.

Figure 1:
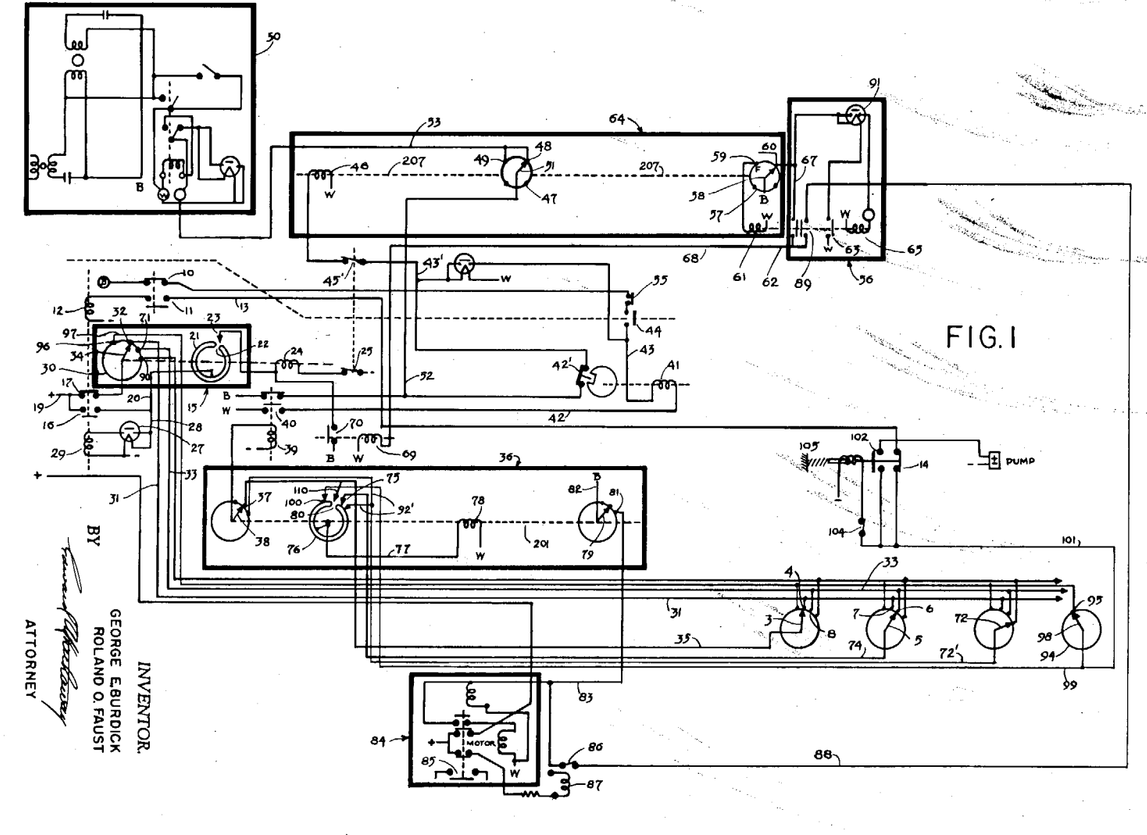
FIG. 1 diagrammatically illustrates electrical and mechanical elements in their functional relationship of what might be termed a "program" circuit.
Figure 3:
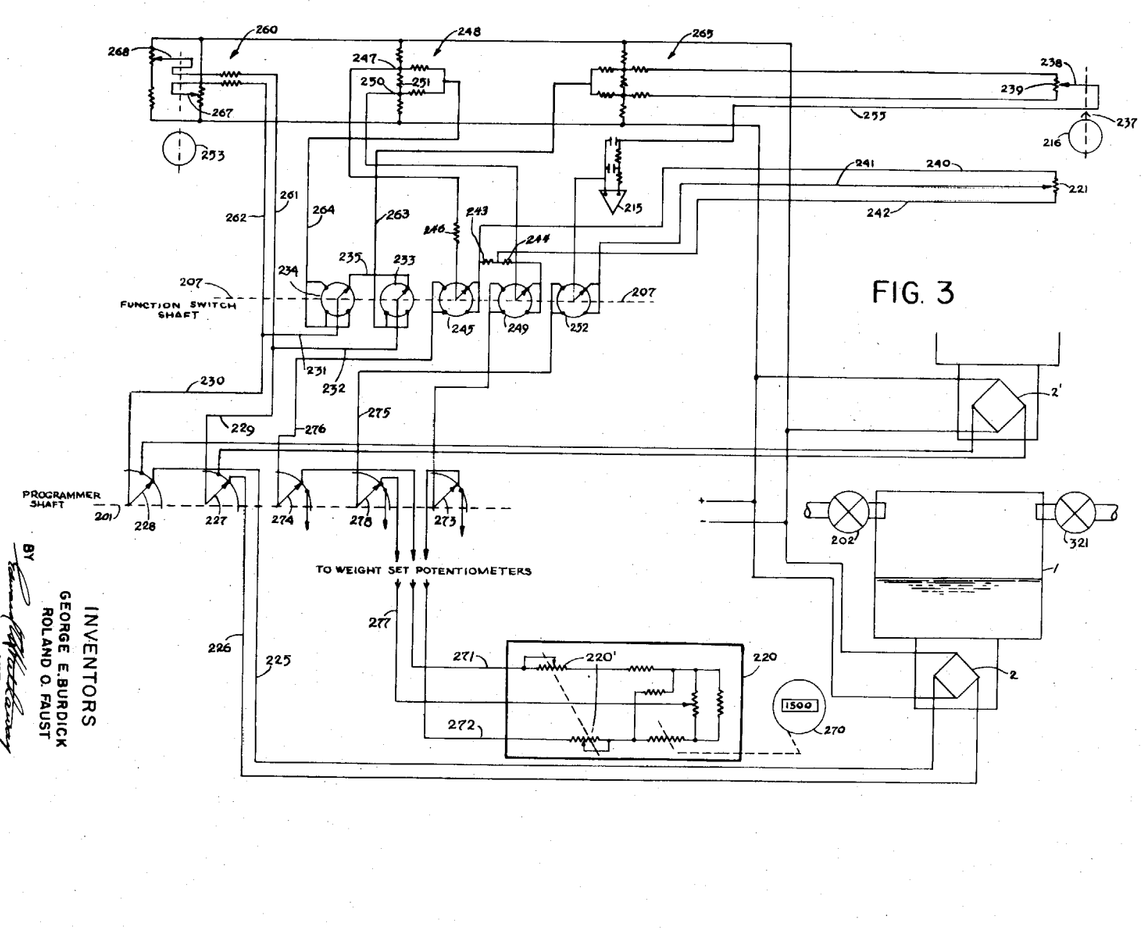
FIG. 3 is a diagrammatic illustration of a weight measuring circuit together with certain elements of the servo-circuit to show the manner in which these two circuits are functionally related to each other and to the program circuit.

The operator first determines the sequence in which various ingredients are to be supplied to a mixing tank 1. FIG. 3, which is mounted upon electrical load responsive cells, diagrammatically shown at 2, of any well-known type such as disclosed in Ruge Patent No. 2,472,047. Other types of force measuring transducers can be used so long as they are of the electrical output type. As shown in FIG. 1, there are several sequence selector switches 3, 5, 72 and 94, each having reference to its own ingredient or to mixing and pumping operations. Assuming that the ingredient to be supplied first is controlled by switch 3, it is manually moved to engage its first contact 4 which represents "No. 1" sequence. If this ingredient were to be supplied second, third, or fourth and so on, its switch 3 would be moved into engagement with a second, third, or fourth contact representing respectively "Nos. 2, 3, or 4" sequence as the case might be. For purposes of illustration, the second sequence is to be an agitation (or mixing) of the first ingredient which is established by manually moving sequence selector switch arm 5 to engage its second contact 6 representing a "No. 2" sequence. The next ingredient to be added is controlled by sequence selector switch 72 engaging its third contact representing "No. 3" sequence. If it is desired to first add the ingredient controlled by switch 72, then this switch is moved to its first contact representing "No. 1" sequence position, and if the ingredient controlled by switch 3 is to be added second then this switch is moved to its "No. 2" sequence position at contact 8. Any number of additional sequence switches may be used depending upon the number of ingredients to be supplied to the mixing tank and each selector switch will have at least as many sequence position contacts as there are ingredients so that the entire number of ingredients may be added in any predetermined order of selection. It will suffice to describe the operation in connection with only the first ingredient followed by a mixing sequence although the other ingredient controlled by sequence selector 72 will be later described. The selector switches are all pre-set prior to overall operation of the system.

The system is now started by first manually moving a start switch 10 upwardly to close normally open contacts 11 thereby to energize a latching solenoid 12 preferably by direct current (sources of this current are indicated throughout the drawings by plus and minus signs). The circuit for the solenoid continues through a wire 13 to a normally closed relay contact 14 to the other side of the line. The latching solenoid 12, when energized, moves upwardly to close a normally open switch 16 and to open a normally closed switch 17. These are held in this position by a suitable latching mechanism 18, FIG. 5. A circuit is thus established from one side of the line 19 across switch 16 to a cycle starting controller, generally indicated at 15, to initiate the batching cycle of the first ingredient. The cycles of subsequent ingredients are also initiated by this controller. The circuit for controller 15 is through a wire 20 to a slipring 21 of a homing-deck, of a type well-known in the art. If it happens that a notch 22 in the slipring is angularly displaced from its present position then a contact 23 would be in engagement with the slipring whereupon the circuit would be completed from wire 20 through the slipring to a rotary ratcheting solenoid 24 of a type well-known in the art. The circuit through the solenoid continues to the other side of the supply line through a manual-automatic selector switch 25 presently shown in its automatic position. The rotary solenoid 24 now ratchets the slipring 21 in a clockwise direction until the circuit is disconnected by the contact 23 entering notch 22. In order to give the homing-deck sufficient time to be brought into such notched position which constitutes its starting position, the latching mechanism 18 is utilized in conjunction with a thermal time delay relay 27 which is initially connected to a source of power by a wire 28 upon closure of contacts 16. Upon expiration of the time a solenoid 29 is energized to withdraw a suitable well-known latching pin whereupon contacts 17 close and contacts 16 open under the action of a usual biasing spring.

Closure of contacts 17 now establishes a circuit through a switch arm 34 and contact 32 of a switch deck 30 to a wire 31 connected to the first contacts 4 and 7, sequence selectors 3 and 5, and to the first contact of each of any other such selectors, such as 72 and 94, or others if used. Wire 31, thus, might be termed "sequence No. 1" circuit and the first contact of switch deck 30 and of each of the selectors as "sequence contacts No. 1." A "sequence No. 2" circuit or wire 33 is connected to a second contact of the switch deck 30 and is also connected to the second contacts 8 and 6 of the sequence selector switches 3 and 5 and to the second contacts of switches 72 and 94 and to other such selectors, if used, and so on for the third, fourth, etc. sequences. These contacts accordingly represent second, third, fourth, etc. "sequence No. contacts."

In order to have the switch 30 initially positioned with connection to the No. 1 sequence wire 31 the switch arm 34 is mechanically connected to the slipring 21 to be commonly actuated by the rotary solenoid 24 so that when notch 22 is in its open position, switch arm 34 is in a corresponding position and properly connected to wire 31.

*Ingredient programmer, and function switch.*—With a voltage now impressed on "sequence No. 1" wire 31, a circuit is established from wire 31 through contact 4, switch arm 3, and a wire 36 to an "ingredient programmer" generally indicated at 36. Various functions performed by this ingredient programmer, as diagrammatically indicated in FIG. 4, includes selecting a group of operating elements for each particular ingredient, e.g., the valve for supplying the pre-selected ingredient to the mixing tank, the proper load cells to weigh that particular ingredient in case each ingredient has its own set of load cells, the mixing timer for that ingredient if an agitation is desired, the pre-set weight measuring circuit for that ingredient, etc. The circuit through the ingredient programmer continues with wire 35 presently shown connected to a contact 37 which is engaged by a switch arm 38 thereby energizing a relay solenoid 39 which closes a normally open double-pole switch 40 so as to energize a function timer motor 41 through wires 42 and 43 and a normally closed phase switch 44 to the other side of the line. Rotation of timer motor 41 actuates a cam controlled timer switch 42' which momentarily closes, say for 20 seconds, to establish a circuit through one of the contacts of switch 40, to a wire 43', and across a manual-automatic switch 45 (shown in its automatic position) to energize a rotary solenoid 46. This solenoid and all deck switches on its shaft 207 are herein generally referred to as the "function switch" 64. Switch 45 is mechanically connected to switch 25 so as to be commonly actuated therewith. Solenoids such as 46 obtain their rotation through a ratcheting operation in response to successive solenoid impulses. This rotary solenoid is mechanically connected to a recorder control deck-switch generally indicated at 47, which has four contacts, two of which are dead and the other two, 48 and 49, are for controlling an error recorder 50. As a switch arm 51 of the recorder switch 47 rotates clockwise it will finally engage check contact 49 to establish a circuit from power switch 40 through wires 52 and 53 to actuate the error recorder 50 which is any well-known strip chart type.

Figures 6, 7:
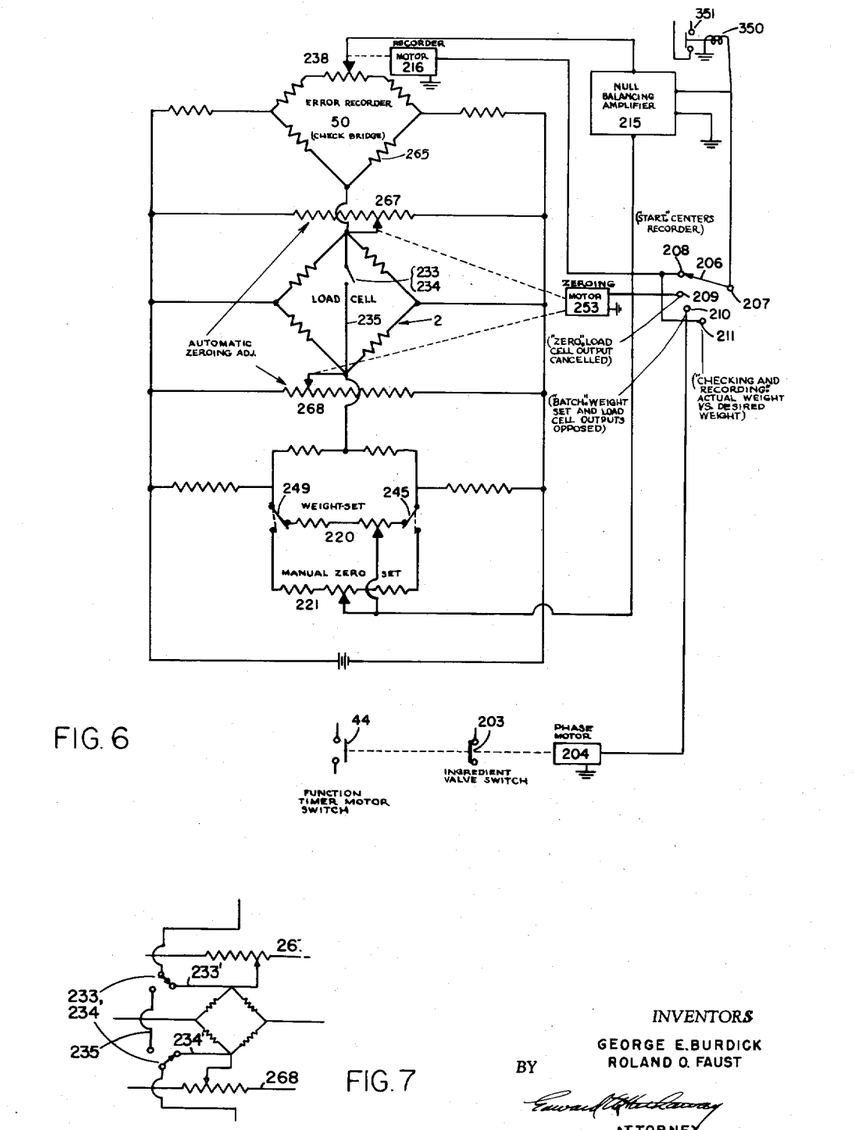
FIG. 6 is a simplified diagram of the measuring system with certain resistors omitted for sake of simplicity.
FIG. 7 is a modified arrangement for shorting-out the load cell bridge network.

This recorder, as is shown in FIG. 6, only records an unbalance in a manner to be described later for the measured circuit between a reference voltage representing a pre-set desired weight of a given ingredient and the load cell voltage representing the actual weight of such ingredient. It will be understood that the recorder is calibrated in pounds. If the error exceeds a predetermined amount the circuit for the timer motor 41 may be shut off automatically by a normally closed safety switch 55 which is actuated by utilizing a well-known contact in recorder 50. If the desired weight is within a predetermined tolerance the system continues to operate in that, upon the next impulse from cam switch 42', switch arm 51 will be moved automatically from the "check" position 49 to "start" position 48. The cam switch cannot, of course, operate if its motor 41 has been previously stopped by opening of safety switch 55.

*Sequence advance controller.*—Upon completion of checking the weight of the ingredient the system is now advanced to the next sequence, i.e., recycled, to add and to weigh a second ingredient. This is accomplished by the provision of a sequence advance controller generally indicated at 56. This is controlled by a switch-deck 57 of the function switch 64 and is provided with start, zero, batch, and check contacts similar to those of the recorder control deck 47. A switch arm 58 sequentially engages such contacts, although only the "check" and "start" contacts are used in this particular portion of the operation. Switch arm 58 is mechanically connected to switch arm 51 so as to have common angular movement and accordingly when switch arm 51 moves from its check to start position the switch arm 58 moves from a position 59 (corresponding to check position 49 of switch deck 47) to its start position 60. When contact 59 was initially engaged it energized a latching solenoid 61 to close normally open contacts 62 and 63. These contacts are latched in their new position by a latching mechanism not shown but similar to latch 18 to be later released by a timer controlled tripping solenoid 65 when energized. As the recorder control deck-switch arm 51 moves from its check position to its start position 48 and carries with it the sequence switch arm 58 to its start position 60, it is at this instant when the system is actually advanced to the next sequence because the cycle starting controller 15 is now actuated by closure of a circuit from contact 60, wire 67, switch 62 now closed, wire 68 to a relay 69 and to the other side of the power supply to close contacts 70 and thus cause ratcheting solenoid 24 to have a single impulse to cause the homing-deck 21 and the switch-deck 30 of the cycle starting controller 15 to move its switch arm 34 one position to close "No. 2 ingredient contact" 71 which for purposes of illustrating the invention is presently considered to be the mixing cycle. Contact 71, even though presently serving a mixing function will be broadly called, an "ingredient" contact as it is customary to add several ingredients before a mixing operation occurs. It should be mentioned that when homing-deck slipring 21 engages contact 23, a circuit is not closed inasmuch as the homing-deck 21 is operative only when the system is initially started as by closure of starting switch contacts 16. Closure of contact 71 impresses a voltage from source 19 through normally closed contacts 17 to wire 33 which is connected to the second ingredient contacts 6, 8, etc. of all sequence selector switches. Inasmuch as these are manually positioned switches for selecting the sequence it is seen that the voltage in wire 33 is effective on contact 6 of only the second ingredient selector switch 5. From this point on the operation is repeated generally as previously described for the first ingredient except that the mixing operation is now made effective. For example, switch arm 5 closes a circuit through a wire 74, contact 75, homing slipring 76 of ingredient programmer 36, and wire 77, to actuate rotary solenoid 78 which is commonly mechanically connected to slipring 76, switch arm 38 and a switch arm 79, to operate the same simultaneously. The solenoid 78 causes slipring 76 to move clockwise until contact 75 enters slot 80 in the slipring and thus disconnects the circuit to solenoid 78.

*Mixing time operation.*—The first ingredient will now be agitated for a predetermined length of time in that switch arm 79 was rotated with the slipring 76 to close a contact 81 and thus establish a circuit from a power source 82 to a wire 83 for initiating the starting of a mixing timer generally indicated at 84 of any suitable type well-known in the art. This timer can be set for, say, one hour and upon expiration of this time it automatically re-sets itself for a subsequent cycle when called upon. The motor for the mixing mechanism (not shown) is controlled by a suitable switch 85 in the timer. When the mixing operation is completed a circuit is closed within the timer 84 so as to energize a solenoid 87 thereby closing a normally open switch 86 to supply power from wire 83 to switch 86 and wire 88 to normally closed contacts 89 (of sequence advance controller 56) and wire 68 to relay 69 for actuating ratcheting solenoid 24. Contacts 89 were closed upon expiration of the time for time-delay relay 91 which energized tripping solenoid 65. The switch-deck 30 is now rotated to its "No. 3 ingredient" contact 90. This contact, as well as any others that can be added to switch 30, would be connected respectively to sequence wires similar to 31 and 33 and to sequence selectors similar to 3 and 5. The operation would continue as for the first and second sequence.

Figures 4, 5:
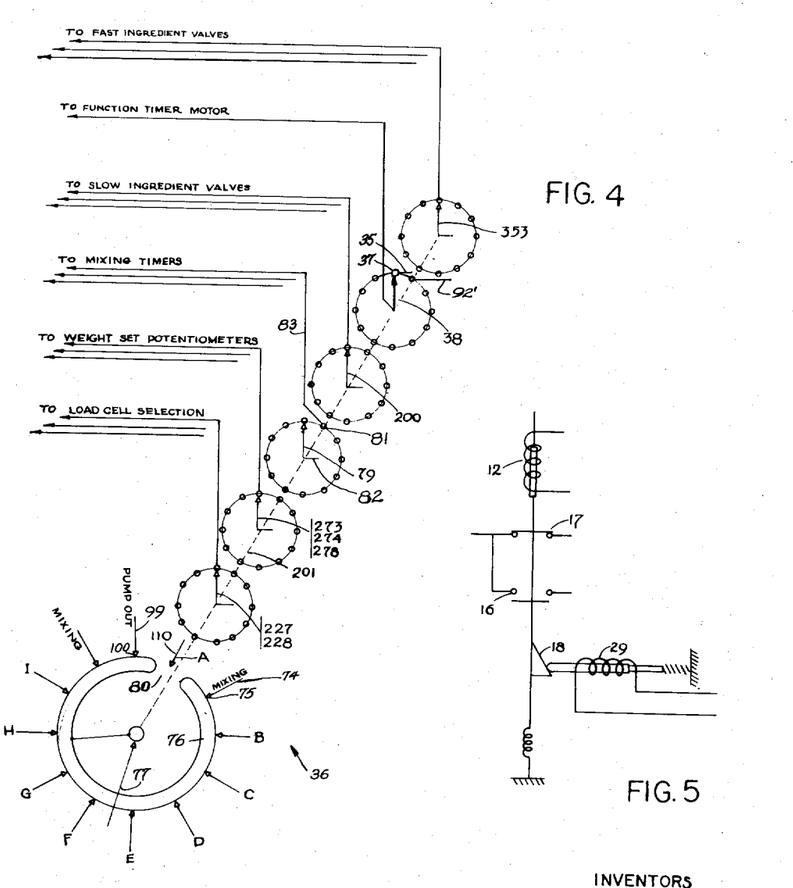
FIG. 4 is a diagrammatic illustration of a program controller for establishing for each ingredient its own individual program of functions to be performed in connection with that ingredient although there are many other switches commonly driven from the program controller shaft.
FIG. 5 diagrammatically illustrates a latching and solenoid controlled releasing mechanism.

The foregoing mixing cycle is assumed to be necessary following the introduction of the first ingredient in order to stir the same for various reasons. If additional ingredients are desired to be added before mixing then additional sequence selector switches, such as 72, are used, one for each ingredient. Each additional ingredient selector switch is commonly connected both to the homing-deck 76 and to a contact of its own on switch 38 in the same manner as ingredient selector 3 is commonly connected to homing-deck 76 and to contact 37 of switch 38. Such a common connection is shown, for example, for switch 72, by a "No. 3 sequence wire" 72'. The ingredient contacts on homing-slipring 76 are, as shown in FIG. 4, lettered A–I to the extent that they are used and they are connected to corresponding contacts on the programmer switch 38. All other programmed operations and control circuits for such additional ingredients would also be similar to those of the first ingredient.

*Pump-out sequence.*—Upon completion of the entire mixing operation the mixing tank is pumped out. To accomplish this a pump-out sequence selector 94 is provided with a last sequence contact 95. A corresponding contact 96 is provided on the cycle starting controller 15 so that when switch-arm 34 has moved to engage contact 96 a circuit is established from power source 19, to switch arm 34, a wire 97, sequence selector contact 95 and selector arm 98 to wire 99, connected to a homing-contact 100 of the ingredient selector 36. Also, upon arm 98 engaging contact 95, a pump motor control circuit is closed from wire 99 through a wire 101 to pumping contacts 102 which are closed by having the operator initially manually close a switch 104 to energize a switch solenoid 105. Power is thus supplied to a pump motor control (not shown). When the pumping operation is completed switch 104 must be opened manually.

*Re-starting after first batching operation.*—After the first batch is pumped out of the mixing tank, as above described, the starting cycle controller switch arm 34 is still in engagement with its pump-out contact 96 and switch arms 38 and 79 of the ingredient programmer are still in positions representing the pump-out operation and accordingly the homing-deck 76 will have its notch 80 opposite its pump-out contact 100. To re-start the next batching operation the operator closes starting switch 10 whereupon, as heretofore described, the ratchet solenoid 24 will be energized by a circuit through switch 16, homing-deck slipring and contact 23 so as to rotate the homing-deck and switch arm 34 until contact 23 enters notch 22. At this position switch arm 34 is engaged with contact 32 for the first selected ingredient. This establishes the circuit through sequence selector switch 3 and back to the contact 110 which is now in engagement with homing-deck 76 to establish a circuit through wire 77 to rotary solenoid 78. This solenoid will thus rotate homing-deck 76, together with switch arm 38, until contact 110 enters slot 80 (as presently shown) and thus disconnect solenoid 78. The switch arm 38 will have been correspondingly moved to its first contact 37 thereby to initiate supply of the first ingredient to the tank. The remaining operations are the same as heretofore described for the first batching operation.

Figure 2:
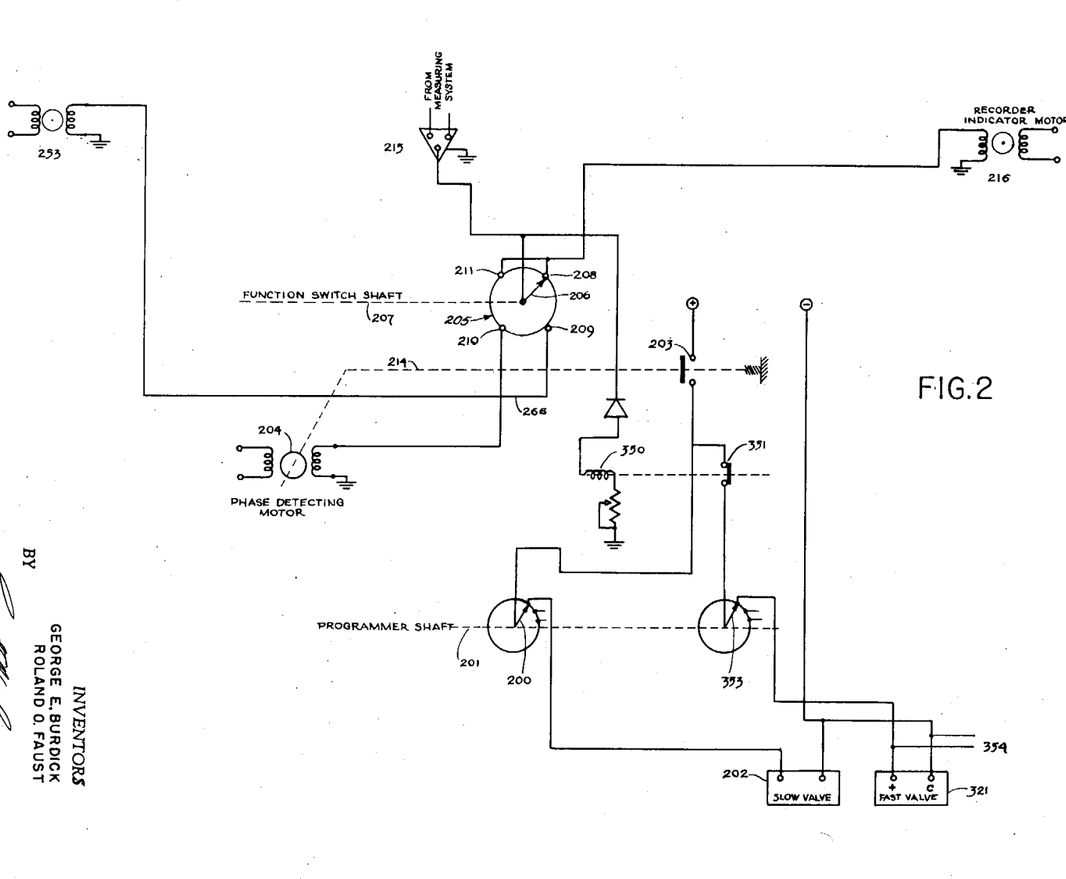
FIG. 2 diagrammatically illustrates a servo-circuit together with certain elements of the program circuit to show the manner in which these two circuits are functionally related.

*Servo-circuit.*—When the ingredient programmer switch arm 38 is in the position shown in FIG. 1 to call for a given ingredient, there is a second switch arm 200, FIG. 2, in a corresponding position mounted on a common shaft 201 with switch arm 38 of the ingredient programmer so as to be commonly driven by the rotary solenoid 78. This switch 200 connects a circuit to actuate a valve 202 for controlling the supply of the ingredient, such valve being broadly referred to herein as a valve means which includes, for example, a liquid valve, dry material gate, stop-start conveyor, etc. for controlling entry of material to the mixing container. The activation of the valve means does not occur until closure of a power switch 203 which is driven by a phase sensitive or detecting means shown specifically as a phase responsive servo-motor 204. This servo-motor is controlled by a second switch-deck 205 whose switch arm 206 is mounted on the function switch shaft 207 to be commonly driven with switches 47 and 57, FIG. 1, by solenoid motor 46. The switch 205 is therefore subject to the timer switch 42'. Hence as impulses from this timer switch are transmitted to the rotary solenoid 46 the switch arm 206 will be successively moved from start, zero, batch, and check contacts 208, 209, 210, and 211 respectively at, say, twenty-second intervals except when the batching contacts are engaged at which time the interval is governed by the ingredient weight. When the batching contact 210 is closed the servo-motor 204 is energized to close switch 203 and thus activate valve 202. The ingredient controlled by this valve will continue to flow into the mixing tank until the electrical output from the load cells cancels out the voltage or unbalance introduced into a measuring circuit, to be described, by a weight-set potentiometer. When this condition of balance exists the driving force on motor 204 is removed (balanced out) allowing switch 203 to open, shutting off the flow of the ingredient. Switch 203 is normally biased in an opening direction, as by a spring. Switches 203 and 44, FIG. 1, are commonly actuated by motor 204 through a common shaft 214, switch 44 being open when switch 203 is closed, and vice versa. The purpose of this is to stop timer motor 41 during supply of the ingredient so that valve 202 is controlled solely in accordance with the weight of the ingredient without any limitation as to time. However, when the proper weight of ingredients has been added to the filling tank and switch 44 closes, then the function timer motor 41 can continue to transmit impulses to the rotary solenoid 46 for rotating the switch 47 and 206 to their check contacts 49 and 211.

During the twenty-second time interval occurring during the check position the weight will be checked. In the check position a circuit is established from the output of a measuring system amplifier 215 to an indicator motor 216 for driving the indicator of the strip chart recorder 50, the indicator being a usual pointer and pen well-known in the art. During this period the difference in voltage between the load cell output and a weight-set potentiometer 220, FIG. 3, is recorded in pounds as the error in weight. If there is no weighing error, no difference will be recorded. Upon expiration of the twenty-second period allowed for checking, the rotary solenoid 46 moves switch arm 206, FIG. 2, to the starting contact 208. In this position a zero reference signal from a "zero adjust" potentiometer 221, FIG. 3, is fed into the input of the amplifier 215 causing the indicator pointer to move to zero as it is driven by the indicator motor.

*Measuring circuit.*—The measuring circuit, part of which has been referred to generally in the disclosure of the servo-circuit, will now be described in more detail as shown in FIG. 3, although its fundamental elements and operation will be more readily apparent from the simplified diagram of FIG. 6 which is later described under the caption "Operation of measuring system."

It is desired, first, to weigh each individual ingredient by electrical means; second, to check the weight for accuracy; and third, to electrically cancel out any signal received due to weight previously added to the batch so that the measuring system signal for each ingredient electrically starts at zero.

More specifically the measuring circuit consists of having the load cell signal transmitted through wires 225 and 226, switch arms 227, 228 (mounted on programmer shaft 201 to select the proper load cells 2 or 2', FIG. 3), and wires 229 and 230 which are finally short-circuited by wires 231, 232 connected to switches 233 and 234 which are now in their starting position and then across shorting wire 235. The switches 234 and 233 are mounted on common shaft 207 of the function switch-deck operated by solenoid 46, FIG. 1. The reason for shorting out the load cell signal at this particular point of the operation is that it is assumed that a previous weighing operation has just been completed and that it is desired to eliminate its effect from the weighing system and to re-set the recorder pointer 237 to zero preparatory to weighing the next ingredient.

To accomplish this the arm 238, FIG. 3, of a slide wire 239 is caused to be mechanically driven by the recorder motor 216 by a definite unbalance set in by zero potentiometer 221 through wires 240, 241 and 242. Wire 240 is connected to a starting contact switch 245 and out the switch arm to resistor 246 to center point of batch bridge generally indicated at 248. The other side of the zero adjust potentiometer wire 242 connects to a juncture of resistors 243 and 244 and through resistor 244 to start contact of a switch 249. This and all similar switches have four contacts consisting, in clockwise rotation, of "start" (the position the switch pointer is presently in as shown in FIG. 3), then "zero," "batch," and "check." The circuit continues through the switch arm to the center point 250. The center point 247 and 250 are in effect one, except for a small calibration resistor 251 interposed between the same. Wire 241 connects with the start contact of a switch 252 and out of the switch to the low side of the amplifier 215. It will be noted that the high side of the amplifier input is connected through a wire 255 to the arm 238. In the circuit just described the zero adjust signal here is being sent by wire 242 through the start contact of switch 252 to the low side of amplifier 215.

It should be remembered that the recorder motor 216, FIG. 2, is in the start position and connected to the output of amplifier 215. Assuming that an unbalance signal exists at the input of the amplifier due to setting of potentiometer 239 or 221, this unbalance will cause motor 216 to drive the indicator slide wire arm 238 until a null point is reached at which time, by setting of potentiometer 221, the zero point of the recorder can be established. This is the entire function performed in the start position. The foregoing is zeroing the recorder which is now followed by zeroing the overall system which will be followed in the next step of the recorder control deck switch 47, FIG. 1, to zero the overall system.

It will be recalled that switch 47 advances one complete revolution for each ingredient. The recorder is given sufficient time to be re-zeroed because the switch 47 remains twenty seconds in such positions as are necessary and as are determined by the timer cam control switch 42". When switch 47 moved to its start contact 48, FIG. 1, the switch arm 58 simultaneously was moved to its contact 60 to effect the next sequence including admission of the second ingredient to the tank. However, the valve for this second ingredient is not opened until switch 47 reaches its batch position. Hence the second ingredient will not be added to the mixing tank during the re-zeroing of the recorder. Upon expiration of the time period of twenty seconds, rotary solenoid 46 then moves all of the switches on shaft 207 to their zero position. This automatically disconnects the recorder completely. Hence, when the rotary solenoid 47 moves shaft 207 and switch 206 to its zero position the entire measuring circuit is then zeroed to eliminate the influence of the weight of any previous ingredient. This is accomplished in that when switches 233 and 234 are moved to their zero position there appears at these switches a signal from the load cells through wires 229 and 230 and also a signal from an automatic zero control 260 through wires 261 and 262. Any unbalance between the load cell signal and the automatic zero control 260 will be transmitted through wires 263 and 264 to a check bridge 265 and the batch bridge 248 respectively. It must be remembered that prior to introduction of the unbalance signals in 263 that the check bridge was in a null state due to the setting of slide wire arm 238 and that in the batch position a null state existed prior to connection of signal wire 264, this null position being brought about by conditions of the zero adjust potentiometer 221. Consequently the introduction of these unbalance signals will be reflected to both the high side of the amplifier 215 from the check batch bridge 265 and to the low side of the amplifier through switches 249 and 252 to the low side of the amplifier 215. As shaft 207 rotates into the zero position the output of amplifier 215 is connected to zero motor through wire 266, FIG. 2, to zero motor 253, FIG. 3. The unbalance signal appearing at the amplifier input causes zero motor 253 to drive potentiometer arms 267 and 268 in opposite directions, as by well-known left and right hand screw threads, until such time as the output of the automatic zero cancels out all signals from the load cells. This measuring circuit is now at electrical zero. Upon the expiration of the twenty-second time period the timer switch 42' then causes rotary solenoid 46 to move the function switch shaft 207 to cause it switches to be moved to batch position. Movement of the switch from zero position disconnects the zero motor 253 and connects in the servo-motor 204 for closing switch 203, FIG. 2, which thereby opens the valve for the first ingredient. Servo-motor 204 opens switch 44, FIG. 1, simultaneously upon closure of the batch valve switch 203, thereby to stop timer motor 41. This allows the ingredient to be supplied to the mixing tank until it reaches a predetermined weight.

This predetermined weight is established by the adjustable weight-set potentiometer 220 which is coupled to a suitable digital counter 270. The unbalance caused by the potentiometer is fed through a circuit including wires 271, 272, switches 273 and 274 and hence through switches 245 and 250 in their batching position and wires 275 and 276 to one side of the batching bridge 248. The center of the potentiometer is connected through wire 277, switch 278 and on through switch 252 in its batching position through wire 279 to the low side of amplifier 215 which drives phase motor 204, FIG. 2. Due to the previous zero cycle there now appears no signal from the load cell. The load cell signal is now coupled to the center point of the check bridge 265 and batch bridge 248. Since the check bridge is at a null state the signal applied is directly to the high side of amplifier 215. However, in the batch bridge an unbalance exists due to the setting of the weight-set potentiometer as the ingredient is added causing a change in load cell output. This change appears at the batch bridge. As the load cell approaches the amount due to the unbalance of the weight-set potentiometer, the system will null causing switch motor 204 to close the ingredient valve and at the same time allow timer motor 41 to restart, completing the batch function. After twenty seconds the timer cam switch closes, advancing switch 47, FIG. 1, to its check position and in so doing all switches on shaft 207 also move to their check positions.

It should be noted that rotation from batch to check positions involves no electrical change in the measuring circuit. However, switch 205, FIG. 2, in moving from the batch to the check position disconnected the phase motor switch 206 and connected the recorder motor 216, thus allowing the error recorder 50 to now read the difference between the unbalance due to the weight-set potentiometer 220 and the actual output of the load cell. Because the recorder reads only said difference, which is the weighing error tolerance, the recorder is herein called an error-recorder.

*Operation of the measuring system, FIG. 6.*—With respect to the servo and programming circuits, it is first desired to center recorder 50 which is accomplished by connecting the slide wire 238 of the recorder to the amplifier 215, the other side of the amplifier being connected to manual zero-set potentiometer 221. If the recorder is not at its zero position the potentiomer 221 is then manually adjusted to establish whatever unbalance is necessary to cause the output from amplifier 215 which is connected through contact 208 to motor 216 to adjust the recorder to its center position. This is the start position. During this centering operation switches 245 and 249 are connected to the potentiomer 221 and the load cell is shorted out by closure of switches 233, 234. It is now desired to eliminate the effects of any previous weight that might be in the batching container or on the load cells in order that the next ingredient can be weighed individually. To do this switch 206 is now moved to contact 209 and load cell shorting switches 233, 234 are opened. Any output from the load cell will be transmitted through switches 245 and 249 and potentiomer 221 to one side of the amplifier and through slide wire 238 to the other side of amplifier 215. As a result there is an output from the amplifier transmitted through switch 206 and contact 209 to cause zeroing motor 253 to reversely drive potentiometers 267 and 268 until the output of the load cells is cancelled out. The zeroing motor 253 has thus brought the measuring circuit into an overall zero balance. Upon expiration of the twenty-second interval allowed for the system zeroing operation the timer motor 41, FIG. 1 (programmer circuit) will then cause cam operated timer switch 42' to energize solenoid 46 thereupon moving switch arm 206, FIG. 2, to batching contact 210. Automatically upon closing contact 210 the common shaft 207 will simultaneously operate switches 245 and 249 to connect the weight-set potentiomer 220 and disconnect the manual zero potentiomer 221. Connection of the weight-set potentiometer will now immediately establish an unbalance in the measuring circuit resulting in an output from the amplifier 215 to a phase detecting means in the form preferably, but not necessarily, of a motor 204 which closed ingredient valve switch 203 to allow the ingredient to flow into the batching container. As the load cells pick up the increasing weight of the ingredient the output from load cell bridge 2 will gradually effect a null balance in amplifier 215. When this balance occurs phase motor 204 automatically opens its ingredient valve switch 203 and closes switch 44 so as to again initiate operation of the function timer motor 41 whereupon cam controlled switch 42' closes to cause shaft 207 to move to its check position. The check position occurs with switch 206 again engaging contacts 208, 211.

Assuming that the weight of the ingredient is not entirely accurate then the output from the load cell passes down through the weight-set potentiometer 220 to one side of the amplifier 215 while the other side of the load cell output passes through potentiometer 238 to the other side of the amplifier. The net unbalance from the amplifier is transmitted through switch 206 and contacts 208, 211 to the strip chart motor 216 to cause adjustment of potentiometer 238 until a balanced condition is obtained. The recorder thus indicates merely the amount of error of the ingrident weight. If the ingredient error is in excess of an amount pre-set in the recorder in a manner well-known in the art then upon the recorder pointer engaging this pre-set amount it causes a master switch (not shown) to be tripped to shut down the entire system and operate a warning signal (not shown) so that the operator will be aware that an excess amount of ingredient has been added and that a correction must be made. On the other hand, if an intolerable amount of under-weight of the ingredient should be present the entire system simply stalls because the signal from the amplifier 215 would not be sufficiently reduced to allow the bias of phase motor 204 to close switch 44 and thereby initiate the check position.

A certain tolerance of underweight is possible without stalling the system because a usual spring (detector bias) built into the phase motor such as 204 for reversely rotating it as the signal approaches null will exert sufficient force to overcome a predetermined value of underweight signal and thereby open ingredient valve switch 203 and close switch 44, FIG. 1, to restart function timer motor 41 so that the system continues in operation. While this detector bias would seem to cause the ingredient weight to be always on the low side this is overcome by the fact that a certain residue of the ingredient is still flowing in the supply pipe after the valve is shut off. The bias can be adjusted to compensate for the amount of this residue and thereby approach the exact desired weight. To obtain a precision setting for the weight-set potentiometer 220, adjustable resistors 220' are placed in the potentiometer circuit.

The measuring system may be summarized as comprising three potentiometer networks, each having two input and two output terminals, the inputs being all fed in parallel from a single D.C. or A.C. source, and the outputs being connected in series so that the algebraic sum is fed to the null-balance amplifier 215. While this amplifier is used to drive two separate null-balancing motors 216 and 253, these motors are never driven simultaneously, one or both being de-energized at various stages of the cycle.

In the start position, zero motor 253 is de-energized, recorder motor 216 is energized, the load cell output terminals are shorted, and the manual zero-set potentiometer 221 is connected into the circuit. The "start" operation consists of moving the manual zero-set adjustment until the recorder motor has driven the strip chart indicator to the exact center of its scale. The primary purpose of this adjustment is to line up the reference point of the measuring system so that the strip chart pen is at the middle of its scale without reference to whether or not the load cell is balanced and without reference to what pre-set ingredient weight may be involved in the cycle.

In the zero position, which is the next step, the recorder motor 216 is de-energized, and the zeroing motor 253 is energized, the manual zero-set potentiometer still being connected in the circuit, and the load cell output shorting switch 233, 234 is opened. At this point, the zeroing motor 216 drives the two zeroing potentiometers 267, 268 in opposite directions so as to bring the net output of the shunted load cell to zero under the starting conditions which include any load that may be on the cell at the time plus any natural unbalance in its output. The ingredient weighing part of the operation may now proceed. The manual zero-set potentiometer is now switched out and the weight-set potentiometer 220 is switched into the circuit. The desired pre-set ingredient weight being set on the calibrated adjustment of the weight-set potentiometer (the ingredient network adjustments, of which the weight-set potentiometer is a part, are in multiple and are switched in for the various ingredients as their turn comes). Both motors 216 and 253 are now de-energized and the output of the null-balancing amplifier 215 is used to actuate relay means 204 to control the flow of the ingredient involved into the weighing tank. This continues until the circuit again comes to balance at which point the null-balance amplifier 215 shuts off the relay means, thus cutting off the feed.

The next step in the "check" operation which checks to see if the operation was performed properly and reports any error which may have existed in weighing out the desired ingredient. In this operation, the potentiometer 220 is still connected in and motor 216 is energized, motor 253 still being de-energized. If there was any error in the ingredient weighed out, motor 216 will drive the strip chart slide wire 233 to indicate a plus or minus error in weight and permanently record it for the ingredient just weighed in.

From this point on everything re-cycles as described above with the exception of the manual zero-set 221 which is adjusted only at the start of a day's run to make sure everything is lined up properly. In other words, from this point on each cycle is shortened to the following sequence:

(1) Recorder motor 216 drives the ingredient error network to the center position (the load cell output being shorted out and the manual zero-set potentiometer 221 being in).

(2) The load cell output is included and the automatic zeroing operation takes place, motor 253 acting alone to eliminate any previous weight.

(3) The weigh and check operations are now effected against the weight-set potentiometer as before.

The load cell bridge network may be shorted out, i.e., eliminated entirely, in the manner shown in FIG. 7 wherein the output corners of the bridge are provided with wire 233' and 234' so that switches 233 and 234 may be connected to wire 235 which is located outside of the bridge. In this way there is no opportunity for a defective contact of the shorting switch in FIG. 6 allowing some of the load cell output to influence the centering of the recorder.

*Fast and slow flow control.*—A further advantage of our improved system, as above described and as shown in FIGS. 2 and 6, is that we can obtain a high degree of accuracy by utilizing slow and fast valves 202 and 321 respectively for admitting an ingredient to the container. The fast valve is, of course, of large capacity and the slow valve of small capacity. As the ingredient weight builds up it causes the output of the load cell bridge to gradually reduce the output voltage of the amplifier 215. When this voltage is reduced to a predetermined value of weight, say 70%, a voltage relay 350 will automatically open a switch 351 of a fast valve circuit thereby closing such valve but allowing the small flow valve to remain open so that the ingredient is now gradually added to the container. When the desired weight has been reached, the bias of phase motor 204 opens switch 203 to close slow valve 202. The fast valve is controlled by a programmer switch 353 in the same manner as slow valve 202 is controlled by programmer switch 200. These two switches thus select the proper set of valves for any particular ingredient. The additional valves are not shown but the lead wires for the same are shown extending from switches 200 and 353. It will also be understood that as ingredients are added it is possible, if desired, simultaneously to blend the ingredients. This is accomplished by simply utilizing the circuit of fast flow valve 321 to control an agitator in parallel with such circuit as shown at 354.

Summary of operation

After pre-selecting the ingredient sequence and the desired ingredient weights, the operator presses the start button 10, FIG. 1, so that a circuit for the first pre-selected ingredient is connected into the deck switch 38 of the programmer 36. Other programmer deck switches have certain contacts, which are closed simultaneously with switch 38 to connect circuits that, when sequentially brought into action, will perform the functions of sequentially selecting the load cells, weighing potentiometer, control valve, and mixing timer, relating to this particular ingredient. In other words, the programmer sets up in a preliminary way the various functions that are to be performed on a given ingredient.

The sequential performance of these functions on the given ingredient is initiated by the simultaneous closure of a fifth switch in the programmer for closing the circuit of a function timer motor 41 (sometimes referred to herein as a function initiator motor) that thereupon operates to cause impulses from cam operated switch 42' to actuate the solenoid 46 which, when energized, intermittently rotates a function switch shaft 207 for certain intervals as follows:

(a) With the function switch shaft 207 in its start position, a twenty-second interval is allowed to return the strip chart recorder to zero.

(b) In the next twenty-second interval, which is the zero position of the function switch 47, the system will now, by means of the automatic zero circuit, operate to cancel out any weight existing on the load cells.

(c) After the function switch moves into the batch position the phasing switch 44 opens, causing timer motor 41 to stop. This eliminates a time controlled interval for this operation so as to allow the ingredient all the time that is necessary for it to flow into the mixing tank until the weight of the ingredient is substantially equal, within a predetermined tolerance, to the amount set in on the weight-set potentiometer 220. When this substantial equality occurs switch 44 closes and the ingredient valve is shut off. The function timer motor 41 now begins to run, and on completion of twenty seconds of operation the function switch moves into its check position.

(d) In the check position the output of the load cells is compared to the output of the weight-set potentiometer; the difference of these two, if any, is read out on the strip chart recorder.

(e) Movement of the function switch 47 from check to start causes cycle starting controller 15 to move to its next ingredient position which connects into appropriate ingredient selector switch.

(f) Ingredient programmer 36 is then operated to assign functions to be performed on the second ingredient which are generally the same as those performed on the first ingredient.

It will be understood that each deck switch, as shown in FIG. 4, such as 38, 79, 200, 201, 227 (228), and 273 (274, 278) of the ingredient programmer 36, has as many contacts as there are sequence selectors, such as 3, 5, etc. Each contact on a given switch, e.g. 273 (274, 278) is connected to its own weighing potentiometer and similarly each contact on the deck switches 200, 79 and 227 (228) is connected to its own mixing timer, ingredient valve, and group of load cells in case there is more than one ingredient container each having its own group of load cells. Hence, as ingredient programmer shaft 201 rotates to take care of the addition of a new ingredient the weighing potentiometer, mixing timer, etc., for that particular ingredient will have its own circuits established. While the switch decks 79, 300, 301 and 302 thus establish many individual circuits for the various programmed ingredient operations, yet the deck switch 38 is so arranged that it initiates operation of only a single set of circuits and mechanism that is common to all of the load cells, weighing potentiometers, mixing timers, and ingredient valves. For instance, switch 38 initiates operation of function timer motor 41, function switch 47, error recorder 50, and sequence advancing controller 56. By having these components common to all programmed operations of each ingredient we are able to relatively simplify our batching system and insure a lower cost of construction and maintenance.

The programmer 36 makes possible the random selection of sequence selectors 3, 5, etc., because the programmer automatically adjusts itself to any position corresponding to a given selector position on any of the multiplicity of selectors. For example, if selector switch 3 is placed in "No. 3 sequence" position, the homing slipring 76 of the programmer will automatically cause switch 38 to move to its "No. 3 contact" to select the proper potentiometer, etc. for the ingredient controlled by selector switch 3. The random selection of ingredient sequences thus lends a high degree of flexibility to the system. The multiplicity of ingredients capable of being controlled by the programmer 36, FIG. 4, are indicated by lettered contacts A–I while the mixing and pump-out positions are shown by suitable legends. As previously stated, only certain ingredient programming circuits are shown for purposes of simplicity but this does not in any way limit our improved system to only those described.

Figure 8:
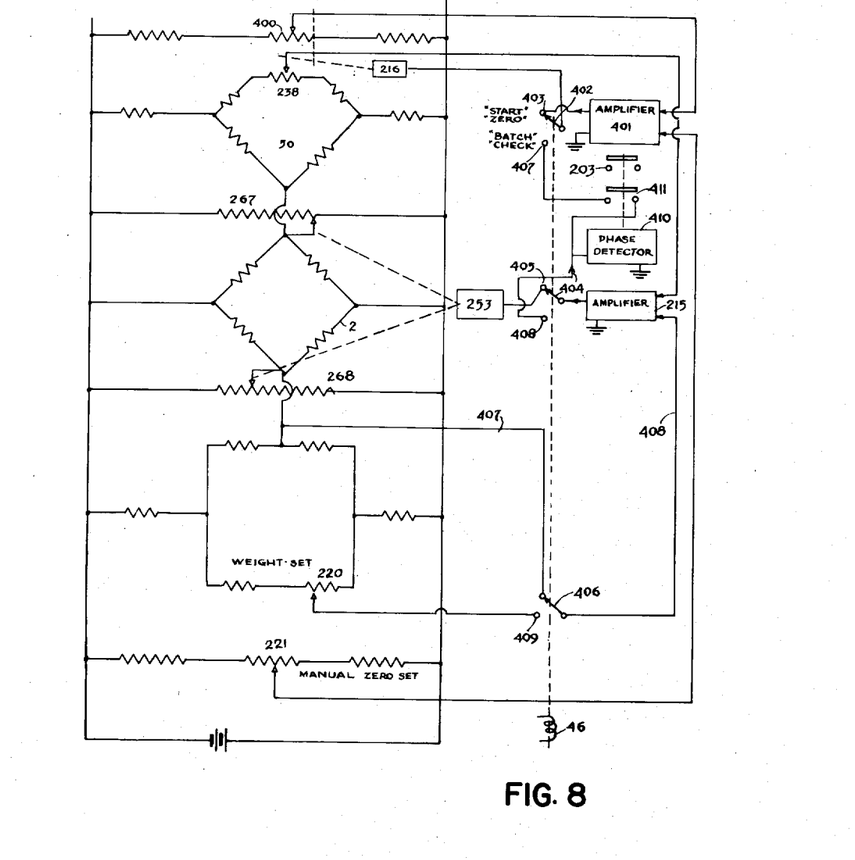
FIG. 8 is a modified circuit for performing certain of the operations simultaneously instead of sequentially.

FIG. 8 modification.—In this modification the operations of "starting" (i.e., recorder centering) and automatic zeroing (i.e., eliminating load cell output) are arranged to be performed simultaneously, and thereafter the batch and check operations are performed substantially simultaneously. To accomplish this we utilize the same network, as in FIG. 6, of the load cell, automatic zeroing adjustment and error recorder. The weight-set and manual zero networks are no longer alternately switched into the measuring circuit, as was done by switches 245 and 249 of FIG. 6, but instead are now permanently connected to such circuit.

There is now added a repeating slide wire potentiometer network 400 whose adjusting arm is mechanically coupled to the arm of recorder slide wire 238 to be moved simultaneously with the latter by the recorder motor 216. An additional amplifier 401 receives the outputs from the repeating slide wire 400 and from the manual zero-set network 221 while the amplifier output is transmitter through switch 402 and contact 403 to motor 216 in one position of the switch. Simultaneously a switch 404 engages a contact 405 to connect motor 253 to the output of amplifier 215 which thus functions in the same manner as in FIG. 6, namely, that the output of the load cell is cancelled by the reversely acting potentiometers 267 and 268 operated by motor 253. Also a switch 406 is operated simultaneously with switches 402 and 404 so as to disconnect the weight-set potentiometer and to connect the load cell output to the amplifier 215 as by wires 407 and 408. The removal of the weight-set potentiometer is necessary to eliminate any unbalance it may cause during zeroing of the measuring circuit.

As a result of switches 402, 404 and 406 being in their above positions (as presently shown in FIG. 8) the recorder is centered and the load cell output is cancelled, i.e., balanced. These operations, herein called "start" and "zero" thus occur simultaneously.

To perform the other operations of batch and check the switches 402, 404 and 406 are now moved to their "batch-check" contacts 407, 408 and and 409. Closure of contact 409 connects the output of the weight-set potentiometer 220 through wire 408 to the input of amplifier 215 along with the output of recorder slide wire 238. Any net unbalance between the two input voltages will be transmitted through contact 408 to a phase detector 409 which, when a null balance occurs in amplifier 215, will then close a switch 411 and a valve switch 203. Closure of switch 411 connects the output of amplifier 215 through contact 407 to the recorder motor 216 thereby adjusting the recorder to read the net unbalance between the actual weight and the predetermined desired weight set on the potentiometer 220. It is thus noted that the recorder cannot operate until the weighing portion of this cycle is first completed.

The switches 402, 404 and 406 are operated by the solenoid 46 shown in FIG. 1 but these switches now take the place of switch decks 206, 207 and 58, while decks 233, 234, 245, 249 and 51 are eliminated. Also the switches 402, 404 and 406 are now two-position decks instead of four positions as is used in FIGS. 1, 2 and 3. The start-zero cycle will be timed by timer motor 41 but will require only one twenty-second interval, whereas the operating time for the batch-check will be controlled by the time required to reach the desired weight of each ingredient.

From the foregoing disclosure it is seen that we have provided a very effective batching system that has a high degree of flexibility of operation in the sequence selection of ingredients and of performing various functions thereon in a predetermined sequence, including weighing of the individual ingredients independently of the weight of any previous ingredients and of insuring a completely automatic operation throughout, while at the same time maintaining a high degree of accuracy, response of the component parts, reliability, and stability of operation at all times. The overall system is completely automatic, fail-safe, and self-checking, capable of precision batching in heavy industrial service. Any sequence of ingredients to any amount may be batched or the ingredients may be omitted at will. The fail-safe operation automatically shuts down the system in the event of any valve or part failure while the automatic check record of each ingredient weighed insures ease of determining what portions of the system may be in error or failure.

It will, of course, be understood that various changes in details of construction and arrangement of parts may be made by those skilled in the art without departing from the spirit of the invention as set forth in the appended claims.

We claim:
1. A batching system for ingredients comprising, in combination, a load cell having a network whose electrical output is responsive to ingredient weight, a group of operating elements which perform certain functions in connection with an ingredient including valve means for supplying the ingredient; a function timer motor; a timer switch intermittently opened and closed by said motor; a power driven function switch controlled by said timer switch so as to be moved sequentially to start, zero, batch, and check positions; a measuring system including a recorder, means for zeroing the recorder in response to the function switch being moved to its start position, means for balancing out any electrical signal from the load cell in response to the function switch being moved to its zero position thereby to nullify the effect of any weight on the load cell, a weight-set network for establishing a predetermined value of weight desired for the ingredient, means for opposing the outputs of the load cell and weight-set networks when the function switch is in its batching position; means, responsive to the function switch being moved to its batching position, for operating the valve means so as to supply the ingredient and for disconnecting the function timer motor thereby allowing whatever time is necessary for supplying the ingredient until the opposed signals have substantially cancelled each other as a result of the predetermined ingredient weight having been substantially reached; means for restarting the function timer motor so as to discontinue supply of the ingredient and to move the function switch to its check position when said opposed outputs substantially cancel each other, and means rendered operative in response to the function switch being moved to its check position to subject the recorder to any signal unbalance between the actual weight of the ingredient and the pre-set desired weight thereof.

2. The combination set forth in claim 1 further characterized in that a plurality of ingredients are to be added and each ingredient has its own group of operating elements which perform certain functions in connection with that ingredient including valve means for supplying a selected ingredient to the batching operation, means for pre-selecting the sequence in which the ingredients are to be added, programming means for sequentially selecting the group of operating elements for each ingredient as its turn comes to be added, and means for rendering the group of operating elements for the second ingredient effective in response to completion of the check operation of the first ingredient.

3. The combination set forth in claim 1 further characterized in that a plurality of ingredients are to be added and each ingredient has its own group of operating elements which perform certain functions in connection with that ingredient including valve means for supplying a selected ingredient to the batching operation, means for pre-selecting the sequence in which the ingredients are to be added, programming means for sequentially selecting the group of operating elements for each ingredient as its turn comes to be added, said function timer motor being activated by said programmer means upon selection of each group of operating elements, and means for rendering the group of operating elements for the second ingredient effective in response to completion of the check operation of the first ingredient.

4. A batching system for ingredients comprising, in combination, a load cell having a network whose electrical output is responsive to ingredient weight, a group of operating elements which perform certain functions in connection with an ingredient including valve means for supplying the ingredient; a function switch movable sequentially to zero, batch, and check positions; a measuring system including a recorder having an initial center position, means for balancing out any electrical signal from the load cell in response to the function switch being in its zero position thereby to nullify the effect of any weight that might be on the load cell, a weight-set network for establishing a predetermined value of weight desired for the ingredient, means for opposing the output signals of the load cell and weight-set networks when the function switch is in its batching position; means, also responsive to the function switch being moved to its batching position, for operating the valve means so as to supply the ingredient until the opposed signals have substantially cancelled each other as a result of the predetermined ingredient weight having been substantially reached; means responsive to the substantial cancellation of the opposed signals so as to discontinue supply of the ingredient and to move the function switch to its check position, means rendered operative in response to the function switch being moved to its check position to subject the recorder to any signal unbalance between the load cell signal representing the actual weight of the ingredient and the signal from the weight-set network representing the desired ingredient weight, whereby only the amount of error in the desired weight is recorded, and means for sequentially adding other ingredients, each such ingredient having its own group of operating elements which perform certain functions in connection with that ingredient including valve means for supplying a selected ingredient to the batching operation, programming means for sequentially selecting the group of operating elements for each ingredient as its turn comes to be added, means for rendering the group of operating elements for the second ingredient effective in response to the completion of the check operation of the first ingredient, and means for recycling the measuring system for the second ingredient as the zero, check, and batch operations occur for the second ingredient, whereby the effect of the weight of the first ingredient in the measuring system is eliminated so that the recorder then responds only to any error that may be present in the weight of the second ingredient.

5. A batching system for ingredients comprising, in combination, a load cell having a network whose electrical output is responsive to ingredient weight, valve means for supplying the ingredient, a recorder and a motor driven adjustable network for establishing a center position of the recorder, a manual zero-set potentiometer network, a zeroing potentiometer network for nullifying any output from the load cell network thereby to eliminate the effect of any previous weight on the load cell, means for simultaneously adjusting the recorder to its center position by operation of said manual zero-set potentiometer network and for adjusting said zeroing network to nullify any output from the load cell network, a weight-set potentiometer network for establishing a value of weight desired for the ingredient, means for connecting the weight-set potentiometer network in opposition to the nullified load cell network so that as an ingredient is supplied its increasing weight on the load cell will cause an increasing output thereof until it substantially balances the output of the weight-set potentiometer, means for discontinuing the supply of an ingredient when said balance is substantially obtained, and means for then adjusting the recorder in accordance with any net unbalance between the load cell and weight-set potentiometers thereby to record only the weighing error of the ingredient.

6. The combination set forth in claim 5 further characterized by the provision of switching means having two positions, means whereby the networks for the recorder centering and the load cell zeroing as well as the manual zero-set potentiometer network are rendered operative for said simultaneous operation in one position of said switching means, and means rendered operative by the switching means, when in its other position, to establish the opposition of the load cell output to that of the predetermined weight-set output and to record any error in the desired weight after closure of the ingredient supply means, (References on following page)

References Cited in the file of this patent

UNITED STATES PATENTS

| | | | |
|---|---|---|---|
| 764,192 | James | July 5, | 1904 |
| 1,632,905 | Kennedy | June 21, | 1927 |
| 2,232,404 | Pratt | Feb. 18, | 1941 |
| 2,336,130 | Saxe | Dec. 7, | 1943 |
| 2,570,148 | Neuroth | Oct. 2, | 1951 |
| 2,610,052 | Macgeorge | Sept. 9, | 1952 |
| 2,688,459 | Merrill et al. | Sept. 7, | 1954 |
| 2,723,844 | Thurston | Nov. 15, | 1955 |
| 2,743,896 | Nauta | May 1, | 1956 |
| 2,787,402 | Stiner et al. | Apr. 2, | 1957 |
| 2,793,000 | Klein et al. | May 21, | 1957 |
| 2,848,019 | Corbin et al. | Aug. 19, | 1958 |
| 2,868,491 | Thorsson et al. | Jan. 13, | 1959 |
| 2,882,035 | Lauler et al. | Apr. 14, | 1959 |
| 2,954,202 | Bale | Sept. 27, | 1960 |

FOREIGN PATENTS

| | | | |
|---|---|---|---|
| 166,250 | Australia | Dec. 7, | 1955 |

OTHER REFERENCES

"Scale Gives . . . Weighing," Product Engineering, May 1952, page 246.

UNITED STATES PATENT OFFICE
CERTIFICATE OF CORRECTION

Patent No. 3,004,617　　　　　　　　　　　　　October 17, 1961

George E. Burdick et al.

It is hereby certified that error appears in the above numbered patent requiring correction and that the said Letters Patent should read as corrected below.

Column 3, line 65, for "36" read -- 35 --; column 10, line 40, for "ingrident" read -- ingredient --; column 12, line 64, before "timer" insert -- function --.

Signed and sealed this 10th day of April 1962.

(SEAL)
Attest:

ERNEST W. SWIDER

Attesting Officer

DAVID L. LADD

Commissioner of Patents